(12) United States Patent
White (10) Patent No.: US 7,711,186 B2
(45) Date of Patent: May 4, 2010

(54) SYSTEM AND METHOD FOR AUTOMATED CORRECTION OF DIGITAL IMAGES

(75) Inventor: Steve J. White, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1476 days.

(21) Appl. No.: 10/866,745

(22) Filed: Jun. 15, 2004

(65) Prior Publication Data

US 2005/0276507 A1   Dec. 15, 2005

(51) Int. Cl.
*G06K 9/00* (2006.01)
*H04N 9/73* (2006.01)
*G03F 3/08* (2006.01)

(52) U.S. Cl. .............. 382/167; 348/223.1; 358/518

(58) Field of Classification Search ............. 382/167, 382/162; 348/223.1; 358/518–523
See application file for complete search history.

(56) References Cited

U.S. PATENT DOCUMENTS

| 6,781,713 B1 * | 8/2004 | Gilman et al. | 358/1.9 |
| 2003/0072496 A1 * | 4/2003 | Woodell et al. | 382/260 |

FOREIGN PATENT DOCUMENTS

EP   1 056 272 A1   11/2000

OTHER PUBLICATIONS

Mann, Steve, Comparametric Equations, Quantigraphic Image Processing, and Comparagraphic Rendering, Intelligent Image Processing, 2002, John Wiley & Sons, Inc.

* cited by examiner

*Primary Examiner*—Matthew C. Bella
*Assistant Examiner*—Randolph Chu
(74) *Attorney, Agent, or Firm*—Shook, Hardy & Bacon L.L.P.

(57) ABSTRACT

A system and method are provided for correcting an image captured by a digital image capturing device. The method includes calculating a log of a desired correction value based on sample point and a target value for that point and calculating an approximation to the log of illumination based on an input pixel intensity. The method additionally includes calculating any target pixel intensity value based on the log of the correction value and the approximation to the log of illumination. Image correction tools correct the image to correspond to the target pixel intensity value. The technique may be used to correct the gain of any image and for example, may correct exposure or color balance deficiencies. The technique provides excellent results regardless of the image capturing device.

15 Claims, 9 Drawing Sheets
(4 of 9 Drawing Sheet(s) Filed in Color)

SYSTEM AND METHOD FOR AUTOMATED CORRECTION OF DIGITAL IMAGES

CROSS-REFERENCE TO RELATED APPLICATIONS

None.

STATEMENT REGARDING FEDERALLY SPONSORED RESEARCH OR DEVELOPMENT

None.

TECHNICAL FIELD

Embodiments of the present invention relate to correction of digital images and in particular to exposure correction and color balance correction in the field of digital photography.

BACKGROUND OF THE INVENTION

Many instances exist in which light levels in images require adjustment, such as when exposure or color balance needs to be corrected. With conventional photography development techniques, correction is accomplished in a darkroom by adjusting filter amounts on an enlarger or by increasing or decreasing the exposure time. Both of these techniques perform linear light adjustments. Each time light or time is doubled, the exposure of all the points of the image doubles regardless of the density at each point.

The response of a print or film to the above correction techniques is not linear. Instead, the response has a rather complex 'S' shaped characteristic curve. In an image area with the most detail or the central part of the total density range, the response is proportional to the logarithm of the image intensity. For every doubling of exposure, a constant step-wise increment in density occurs. Hence, with a step chart in which each gray patch represents a doubling of the density of its neighbor, each step change appears to be a uniform density increment relative to its neighbor.

Correction characteristics for digital cameras also have a non-linear response. However, digital cameras typically have physical limitations in the sensor dynamic range that makes the characteristic curve typically different than the 'S'-shaped (log-linear) curve of the conventional film. This nonlinear response is encoded in the final images that digital cameras produce in image files (e.g. jpeg or tiff) or from raw image processors as output. Although the raw data reflect the direct output from the sensor and therefore are inherently linear, typical cameras or raw processing software modify this output to produce a non-linear response in the color-space used in viewers and editors. Unfortunately, the tools provided in the editors and viewers do not account for the non-linear response, thus resulting in poor color and exposure adjustments in most situations. Simple 'gamma' models of the response curve non-linearity result in poor approximations and are poorly suited for making accurate and visually acceptable adjustments to color or exposure.

Furthermore, current image correction techniques for digital cameras such as those used in the Adobe Photoshop software, from Adobe Systems Incorporated are based on specific camera characteristics and accordingly cannot be used universally for all digital cameras. A technique is therefore needed that is capable of image correction for images produced by any digital camera.

Figure 8:
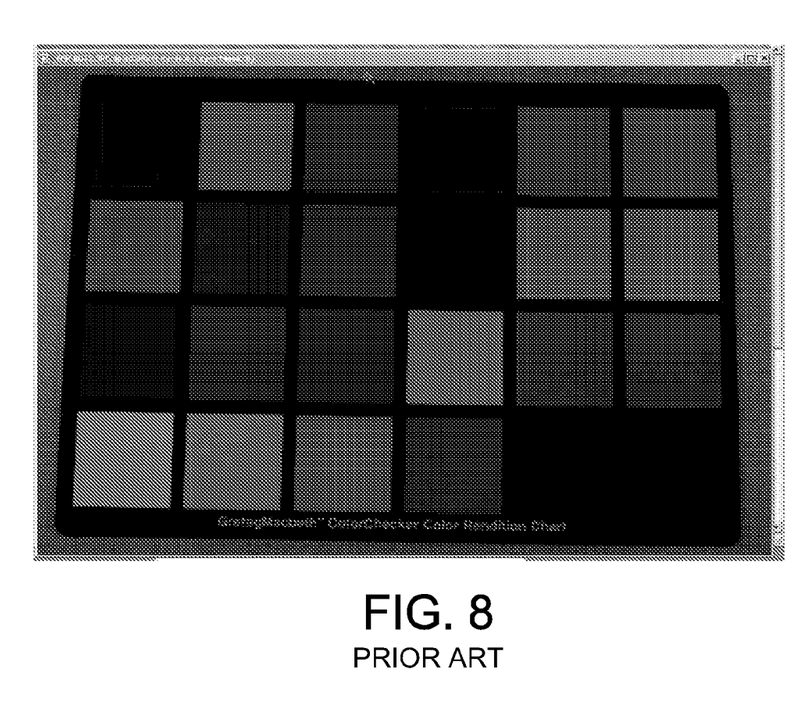
FIG. 8 illustrates an underexposed image.
Figure 9:
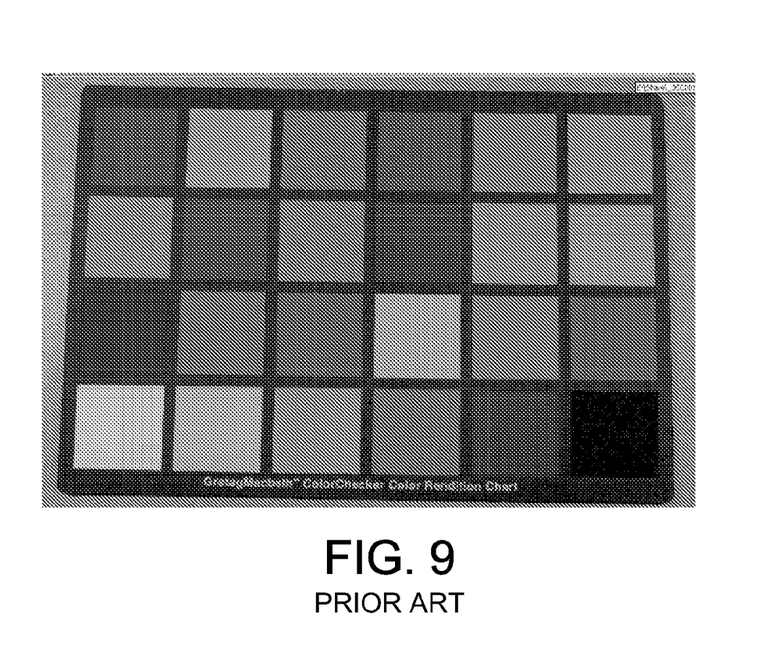
FIG. 9 illustrates a mapping of the underexposed image of FIG. 8 using the curve of FIG. 6.

With regard to exposure, FIG. 8 illustrates a test chart for an under-exposed image. The test chart of FIG. 8 represents an image under-exposed by one or two f-stops. The f-stop number indicates the relative size of the opening of the lens or aperture. The number is obtained by dividing the focal length f of a lens by its effective aperture. In the conventional series, each number represents an aperture that admits half as much light as the preceding one. The test chart shown in FIG. 8 may have, for example, been two f-stops underexposed at f/5.6. The test chart of FIG. 9 showing a properly exposed image at an exposure of f/2.8. The change of the intensities of the grey patches from FIG. 8 to FIG. 9 can be seen in a comparison of the two test charts.

Figure 6:
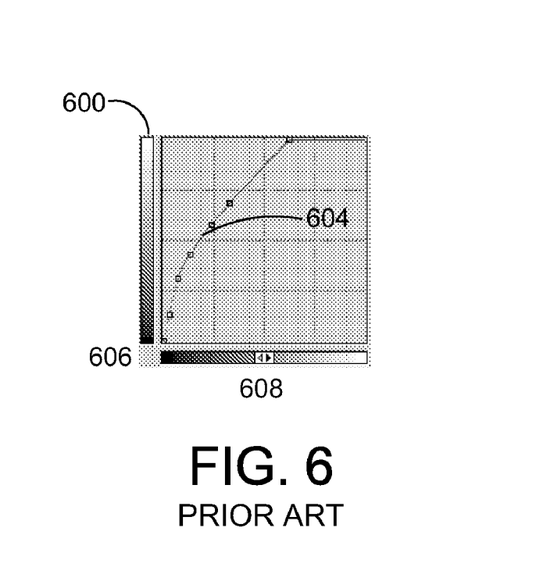
FIG. 6 illustrates a screen shot showing an example mapping to correct for an under-exposed image.

If the relative pixel intensities of the grey scale patches are plotted using a tool such as an Adobe Photoshop Curves tool, the relationship is illustrated as non-linear as shown in a screen shot 600 illustrated in FIG. 6. The plotting process requires measurement of each of the plotted points. The screen shot 600 illustrates a non-linear plot 604 that shows underexposed values on the x-axis 608 and properly exposed values on the y-axis 606. The illustrated curve is a lookup table and may be created for each RGB channel so that an entire image can be transformed to the correct lookup values. The Photoshop Curves tool shows the response correction for a 4× (2 stop) under-exposure. The grey-values of the under-exposed image in FIG. 8 will map to the correctly exposed values shown in FIG. 9. As set forth above, using currently existing tools, the relationship shown in FIG. 6 can only be achieved through detailed and laborious measurements.

Figure 7:
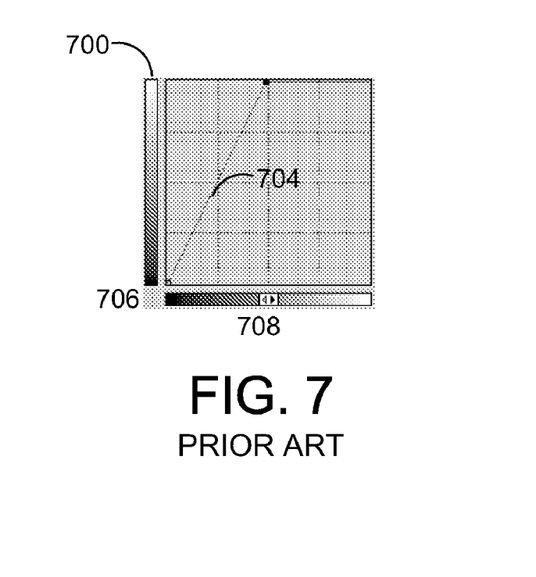
FIG. 7 illustrates a screen shot showing an example of an end-point white level correction curve.
Figure 10:
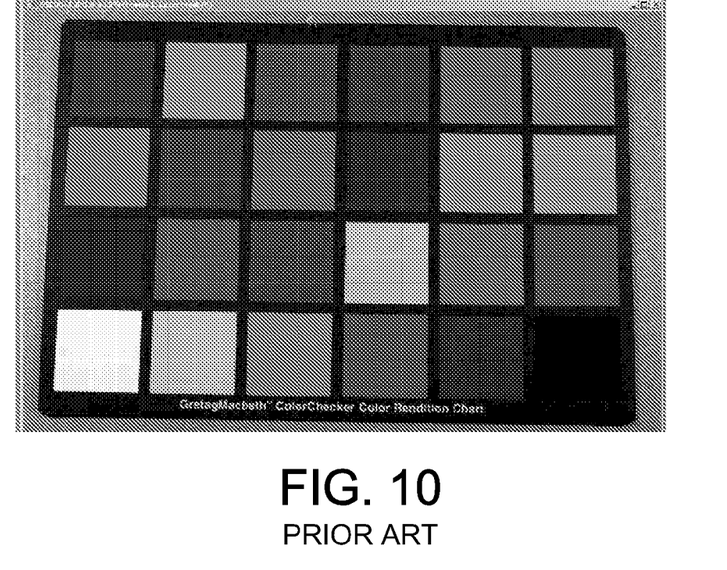
FIG. 10 illustrates an exposure adjustment accomplished using endpoints.

One existing approach for the correction of under-exposure in Adobe Photoshop and other editors is end-point white level correction. FIG. 10 illustrates a test chart produced by this technique. This process results in a much different mapping than the values measured between actual exposure changes in FIG. 6. Instead, the relationship is largely linear as shown in FIG. 7. A screen shot 700 of FIG. 7 shows a plot 704 that includes underexposed values along the x-axis 708 and the corrected values on the y-axis 706. As illustrated in FIG. 10, the artifacts of end-point white level correction include the production of harshly saturated and high contrast as side effects to the attempted correction.

In addition to exposure correction, another area in which image correction is often implemented is color balance. A frequently used technique for achieving an optimal color balance in digital cameras is a white balance technique. Using white balancing, a neutral patch, or some approximation of a neutral patch such as a cloud or white shirt, is selected in the image. The individual channel color exposures (channel gain in RGB or CMY) are then adjusted in order to cause the neutral color to appear neutral.

Figure 11:
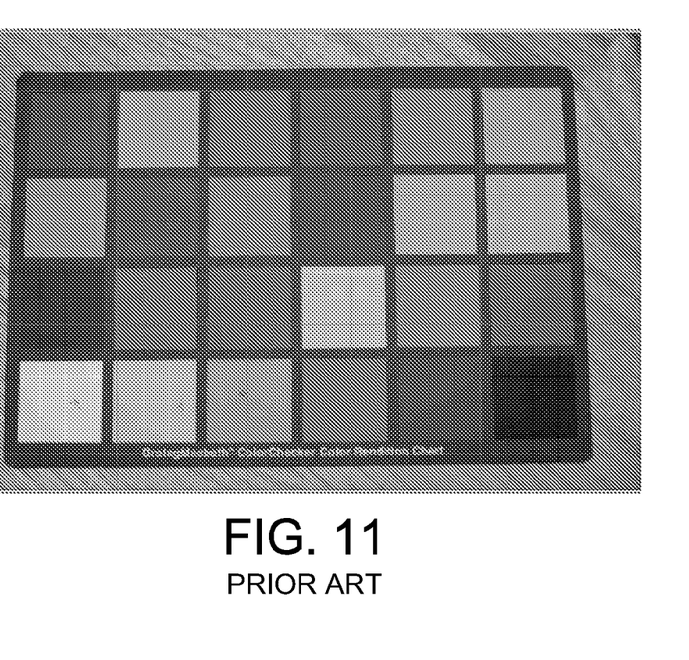
FIG. 11 illustrates an incorrect white balance.
Figure 12:
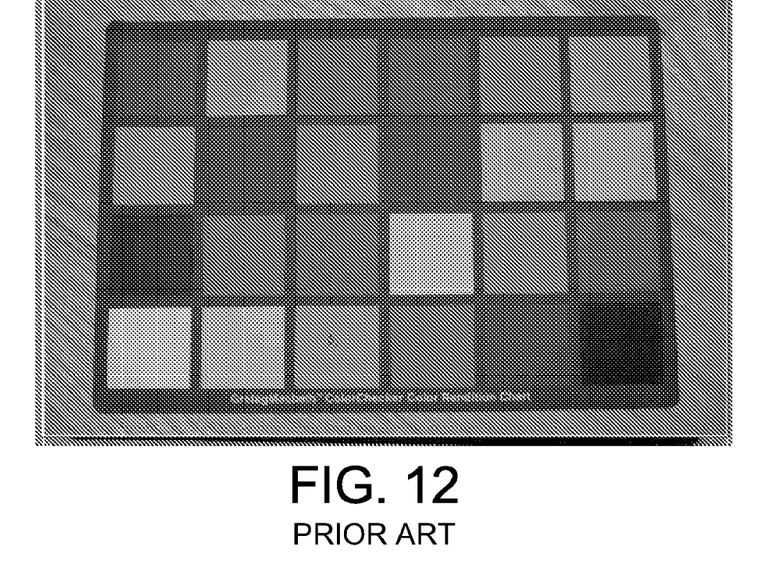
FIG. 12 illustrates a gain-based color balance.

This technique suffers from several deficiencies. For example, a single white point will not provide an optimal correction for all of the intermediate colors. FIG. 11 illustrates an incorrect white balance achieved using tungsten light with a daylight setting. FIG. 12 illustrates the result of adjusting the gain for each color channel in the image to correct for the colorcast by getting one grey point correct (third from left on the bottom row). The highlights have a blue cast (see the lower-left white patch) while the darker areas are shifted to red.

Figure 13:
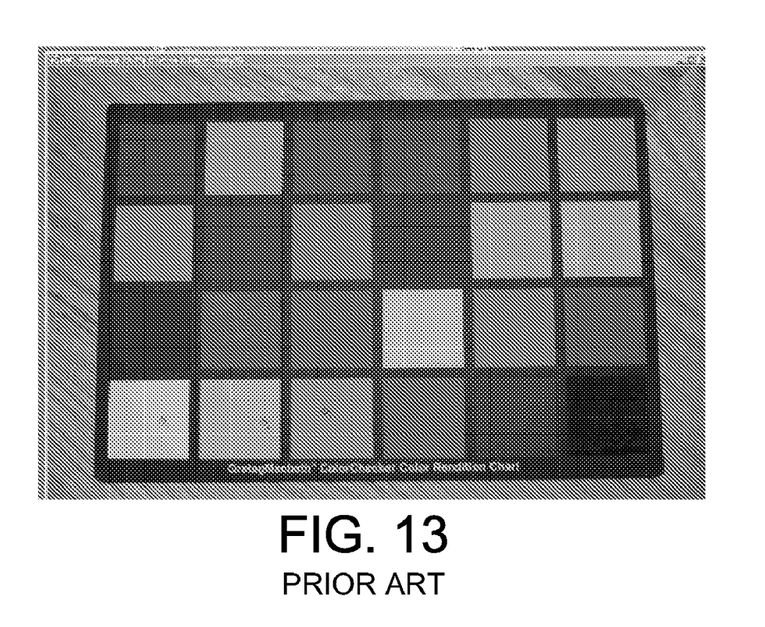
FIG. 13 illustrates image correction using measured camera characteristics.

By using individual channel exposure curves obtained through measured camera characteristics, a curve similar to the curve from FIG. 6, and thus better results, can be obtained as shown in FIG. 13. However, as explained above, this process is laborious and requires multiple individual measurements.

The corrected images shown in FIGS. 9 and 13 above were hand-corrected using the Adobe Photoshop editing program. This technique is successful when many known grey-values exist. However, even though the technique is successful, it is labor intensive and often impossible due to the lack of neutral patches available for reference.

One way to solve this problem is to work with data that is in linear space where double the light means double the intensity, or a logarithmic space where each doubling of light intensity results in a constant increment of pixel value. Raw file programs like Adobe RAW, Phase One Raw products, and independent hardware vendor (IHV) proprietary raw editors such as Nikon Capture will allow adjustments in the linear space to facilitate simple gains. However, since digital cameras have typically already mapped the images to a non-linear color space by the time most photo-editors can open them, this technique is simply not feasible once the image has been converted into a viewable color space such as sRGB by the camera.

In practice, a technique is needed for obtaining a mapping similar to that shown in FIG. 6 based on a model of the camera non-linearity. Furthermore, a solution is needed that applies to all digital cameras and is accurate across the dynamic range of the camera.

BRIEF SUMMARY OF THE INVENTION

Embodiments of the present invention are directed to a method for correcting an image captured by a digital image capturing device. The method includes calculating a log of a desired correction value based on sample point and calculating an approximation to a log of illumination based on an input pixel intensity. The method additionally includes calculating a target pixel intensity value based on the log of the correction value and the approximated log of illumination. Furthermore, the method includes providing image correction tools for correcting the image to correspond to the target pixel intensity value.

In a further aspect of the invention, a method is provided for correcting an image captured by a digital image capturing device. The method includes incorporating constants that represent characteristics of an arbitrary digital image capturing device and calculating an approximation to a log of illumination based on the incorporated constants and an input pixel intensity value. The method additionally includes determining a target pixel intensity using the approximation to the log of illumination, a desired correction value, and the incorporated constants. The constants for any image capturing device result in an identical target pixel intensity. The method further includes providing image correction tools in order to adjust the image to the target pixel intensity.

In yet an additional aspect, an image correction system is provided for correcting an image. The system includes correction value calculation components for calculating a desired correction value based on a sample input point and the approximation to illumination log calculation components for determining a log of illumination based on a pixel intensity and selected constants. The system also includes target pixel log intensity calculation components for determining a target pixel intensity in order to correct the image based on the correction value calculation, the illumination log approximation calculation, and the selected constants. The nature of the calculations results in identical target pixel intensity values regardless of the constants of digital image capturing device responsible for capturing the images.

BRIEF DESCRIPTION OF THE DRAWINGS

The patent or application file contains at least one drawing executed in color. Copies of this patent application publication with color drawing(s) will be provided by the Office upon request and payment of the necessary fee. The present invention is described in detail below with reference to the attached drawing figures, wherein.

DETAILED DESCRIPTION OF THE INVENTION

I. System Overview

Embodiments of the invention include a method and system for performing image correction for digital images in order to increase the accuracy of the appearance of digital images. Types of image correction may include exposure correction and white balance correction. An image correction module 10 is provided that is capable of correcting images from a non-linear data form. The image correction module 10 may either be incorporated in a computing system or within a digital camera.

Figure 1:
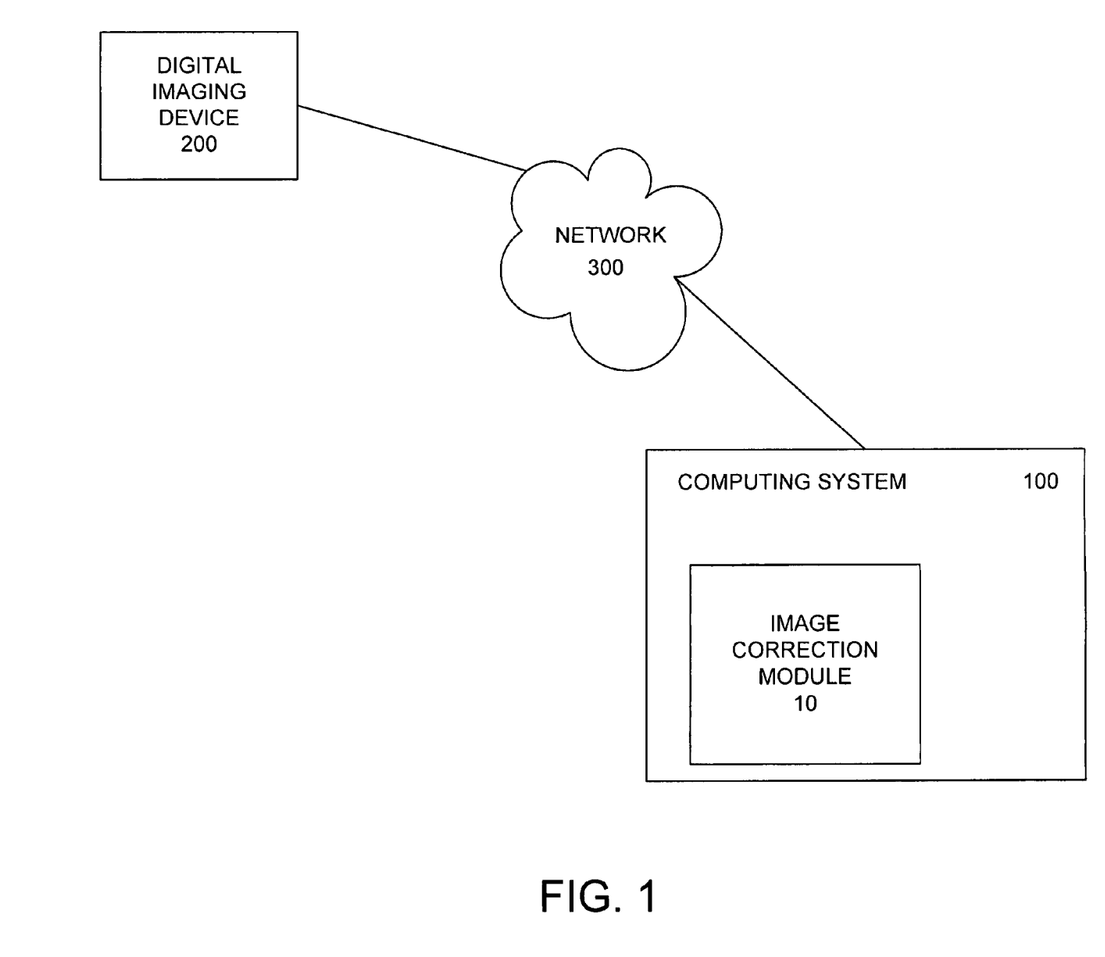
FIG. 1 is a block diagram illustrating an overview of a system in accordance with an embodiment of the invention.

FIG. 1 shows an embodiment in which the image correction module 10 is incorporated in a computing system 100. The computing system 100 may communicate over a network 300 with a digital imaging device 200 such as a digital camera. The presence of a network is optional however, as the digital imaging device 200 may be directly connected to the computing system 100. Additionally, the computing system 100 and the digital imaging device 200 may be entirely unconnected. Rather, an image storage device, such as a flash RAM, may be used to transfer images from the digital imaging device 200 to the computing system 100. Furthermore, as stated above, the image correction module 10 may be incorporated directly in the digital imaging device 200.

The image correction module 10 operates based on an algorithm that processes arbitrary input/output calibration points. For example, the image correction module 10 can take a color temperature shift or white point sample and target and produce correction curves for an entire image. The operation of the image correction module 10 will be further described below in conjunction with the method of the invention.

Figure 2:
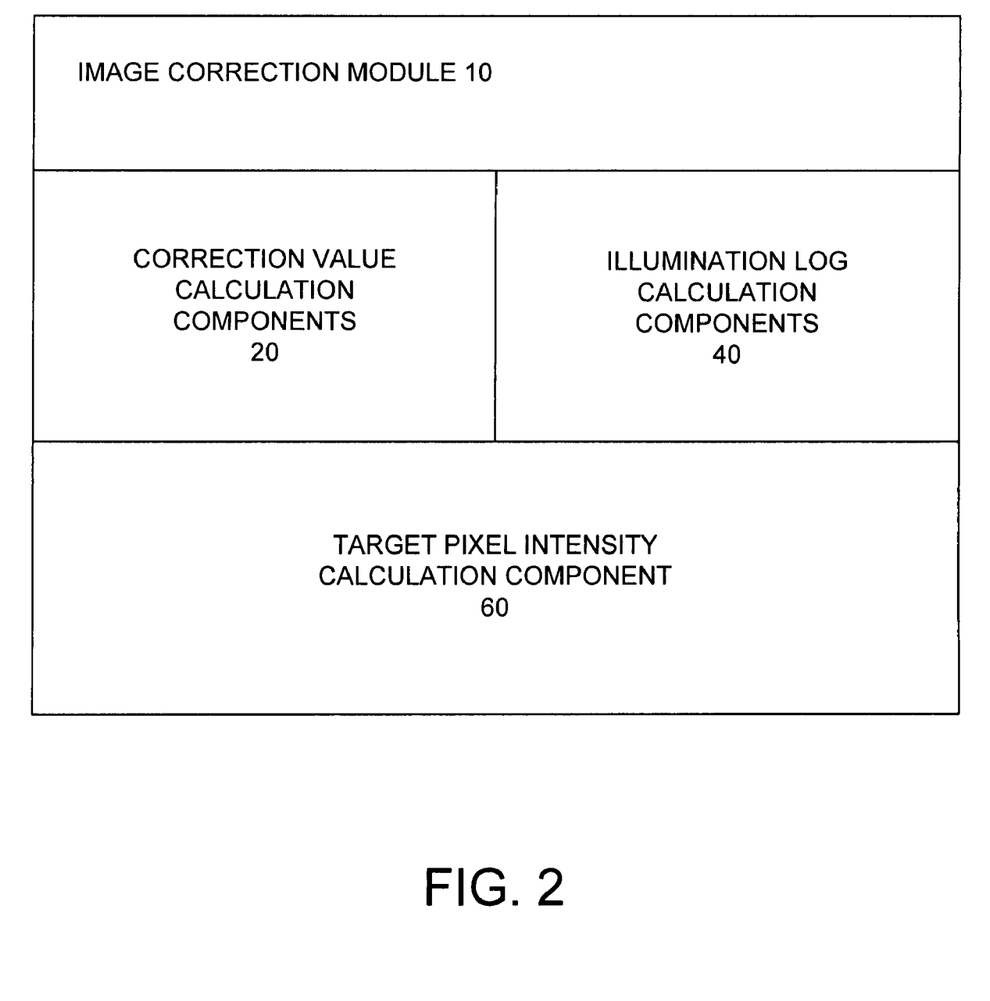
FIG. 2 is block diagram illustrating components of an image correction module in accordance with an embodiment of the invention.

FIG. 2 illustrates further details of the image correction module 10 in accordance with an embodiment of the invention. The image correction module 10 may include correction value calculation components 20, illumination log calculation components 40, and target pixel log intensity calculation components 60. Each of these components will be further explained below with reference to the method of the invention.

II. Exemplary Operating Environment

Figure 3:
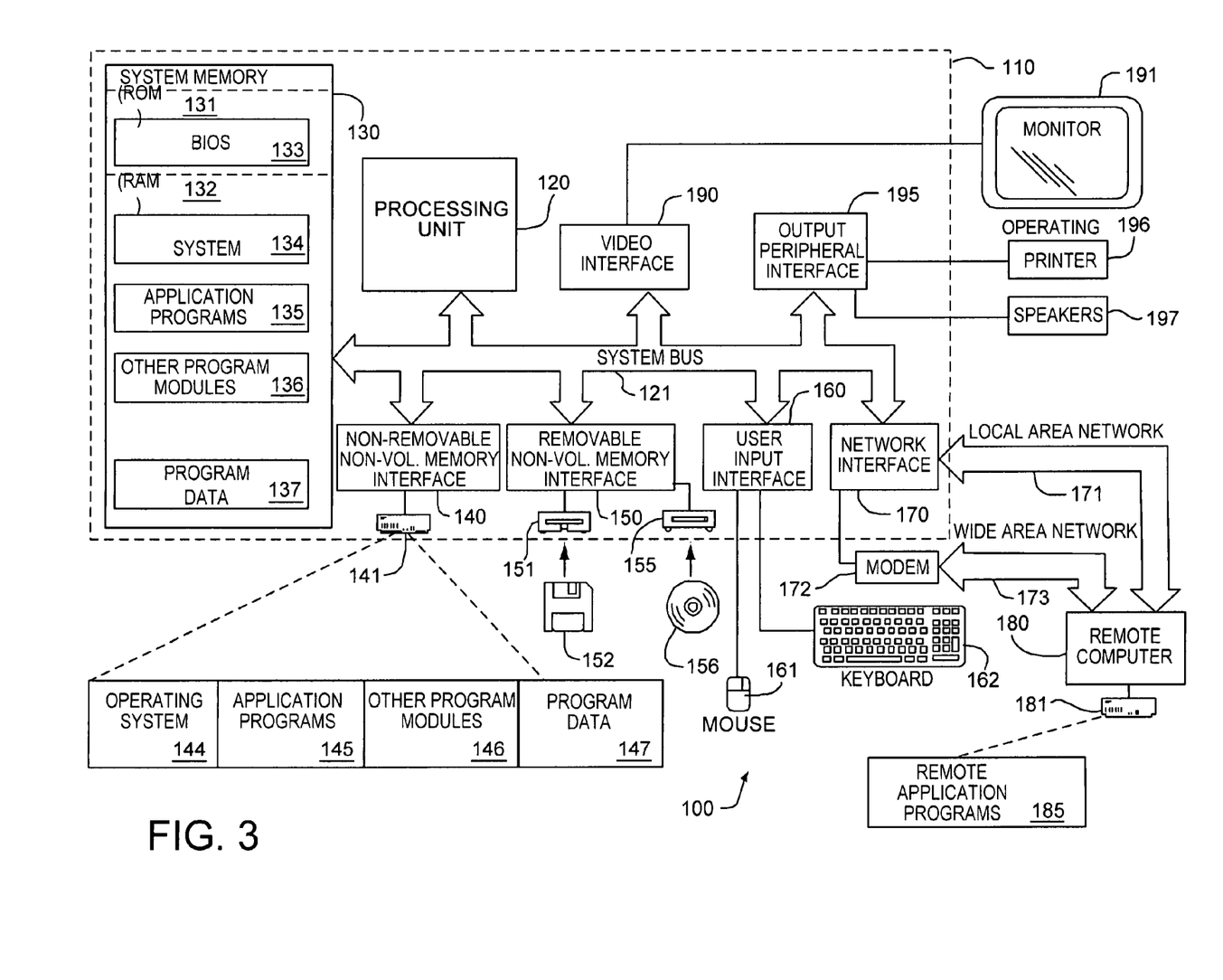
FIG. 3 is a block diagram illustrating a computerized environment in which embodiments of the invention may be implemented.

FIG. 3 illustrates an example of a suitable computing system environment 100 on which the image correction module 10 may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 3, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/non-removable, volatile/nonvolatile computer storage media. By way of example only, FIG. 3 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3, provide storage of computer readable instructions, data structures, program modules and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 3. The logical connections depicted in FIG. 3 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. System and Method of the Invention

As set forth above, FIGS. 1 and 2 illustrate an image correction module 10 for correcting digital images. The image correction module 10 is capable of performing corrections to overall gain for exposure correction and of correcting individual channel gain for color white point correction. The image correction module 10 makes these corrections by taking into account forward and reverse transforms from linear to non-linear space.

As mentioned above, film has linear response characteristics in a low-exposure 'foot' of the curve and approximately logarithmic response characteristics in a central response region. Digital cameras have very similar response characteristics. Tests of numerous digital cameras show that response can be accurately modeled using a quadratic form where D is the pixel intensity and LogI is the log of the illumination.

$$D = a(\text{Log } I)^2 + b \text{Log } I + c \quad (1)$$

The symbols a, b, and c represent constants that are typically specific to each digital camera. The quadratic-of-log relationship of Equation (1) has a form very similar to the film characteristic over most of the range of a sensor. The relationship only deviates significantly when intensity approaches its maximum. In this region, the film characteristic curve tapers off. In contrast, the transition for digital sensors is more abrupt. The more abrupt response characteristic typically results in the propensity for digital cameras to capture minimal detail in bright regions. Thus, while the technique approximates film characteristics, the replication is not exact.

LogI in the above equation (1) can be calculated through the use of the quadratic root solution:

$$\text{Log} I = \frac{-b \pm \sqrt{b^2 - 4a(c - D)}}{2a} \quad (2)$$

Equation (2) can be utilized by the illumination log calculation components 40 of the image correction module 10 to calculate an approximation to LogI. Thus, given arbitrary camera characteristic coefficients a, b, c, in the equations above, the image correction module 10 can implement the target pixel log intensity calculation component 60 to calculate a target curve in which a target pixel value, represented by D' is plotted vs. an input pixel value D. Curves can be created for all possible D values. Typically D values may range between 0 and 255. Additional values may also be utilized.

Figure 4:
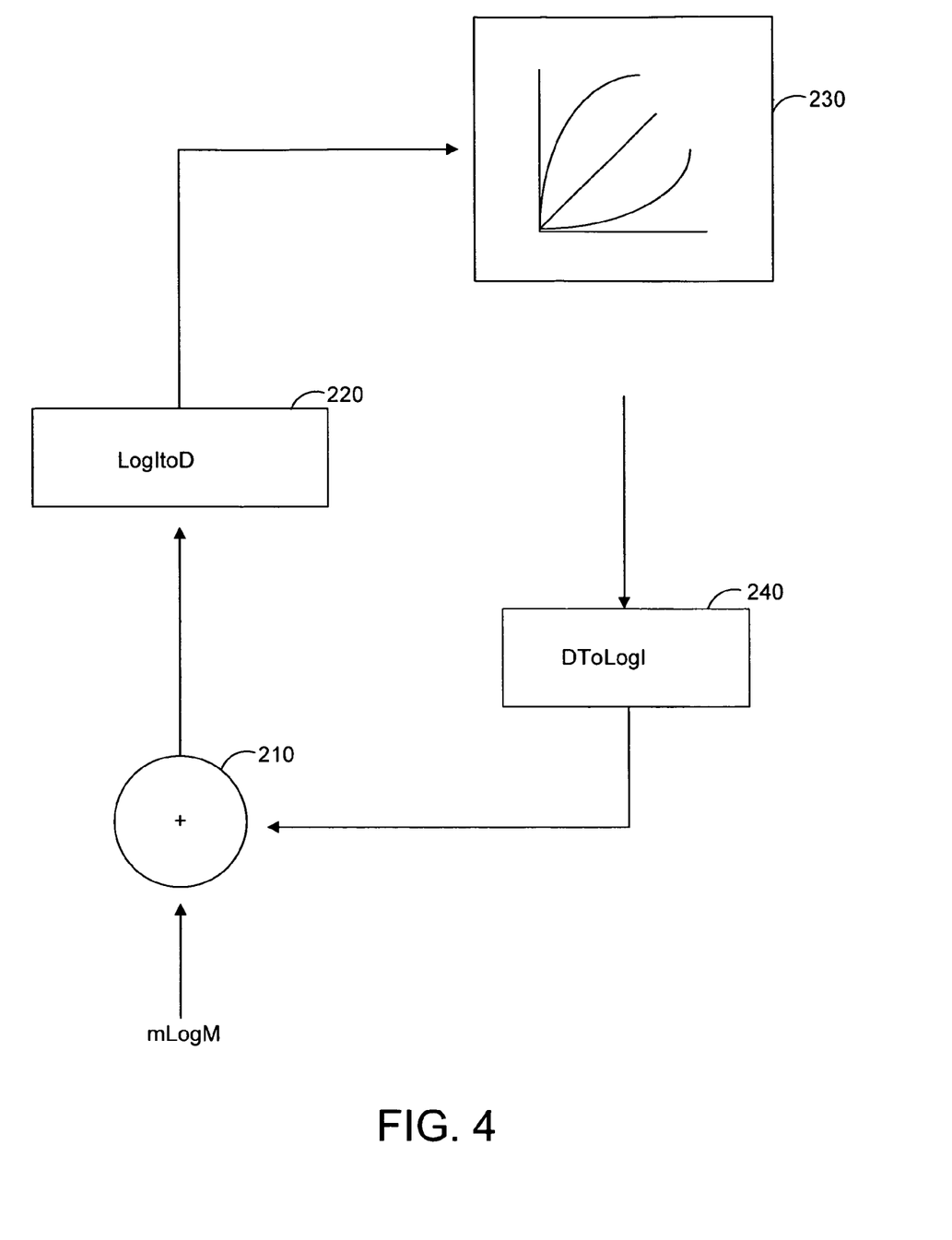
FIG. 4 is a block diagram illustrating a gain control mapping in accordance with an embodiment of the invention.

FIG. 4 illustrates an embodiment of gain control via mapping to a LogI domain for each sample point D. As a preliminary step, a correction value, Log M, is calculated. Taking a sample point, the system makes a D to Log I transformation at 240 using equation (2). The pre-calculated correction amount LogM is added to LogI at 210. A LogI to D transformation is performed at 240 using equation (1). Through this technique, a mapping such as that shown at 230 is achieved. The process may be repeated for multiple input sample points.

Each camera generally has very different characteristic coefficients a, b, and c to best approximate its response curves. However, the calculation components described above have proven to be coefficient independent. Any non-zero choice for the coefficients a, b, or c produces exactly the same results. The system can implement values for an arbitrary camera, such as Nikon D100 values, and get correct curves for all cameras. The system can use arbitrary (non-zero) settings for a, b or c and get precisely the same curve values.

Figure 5:
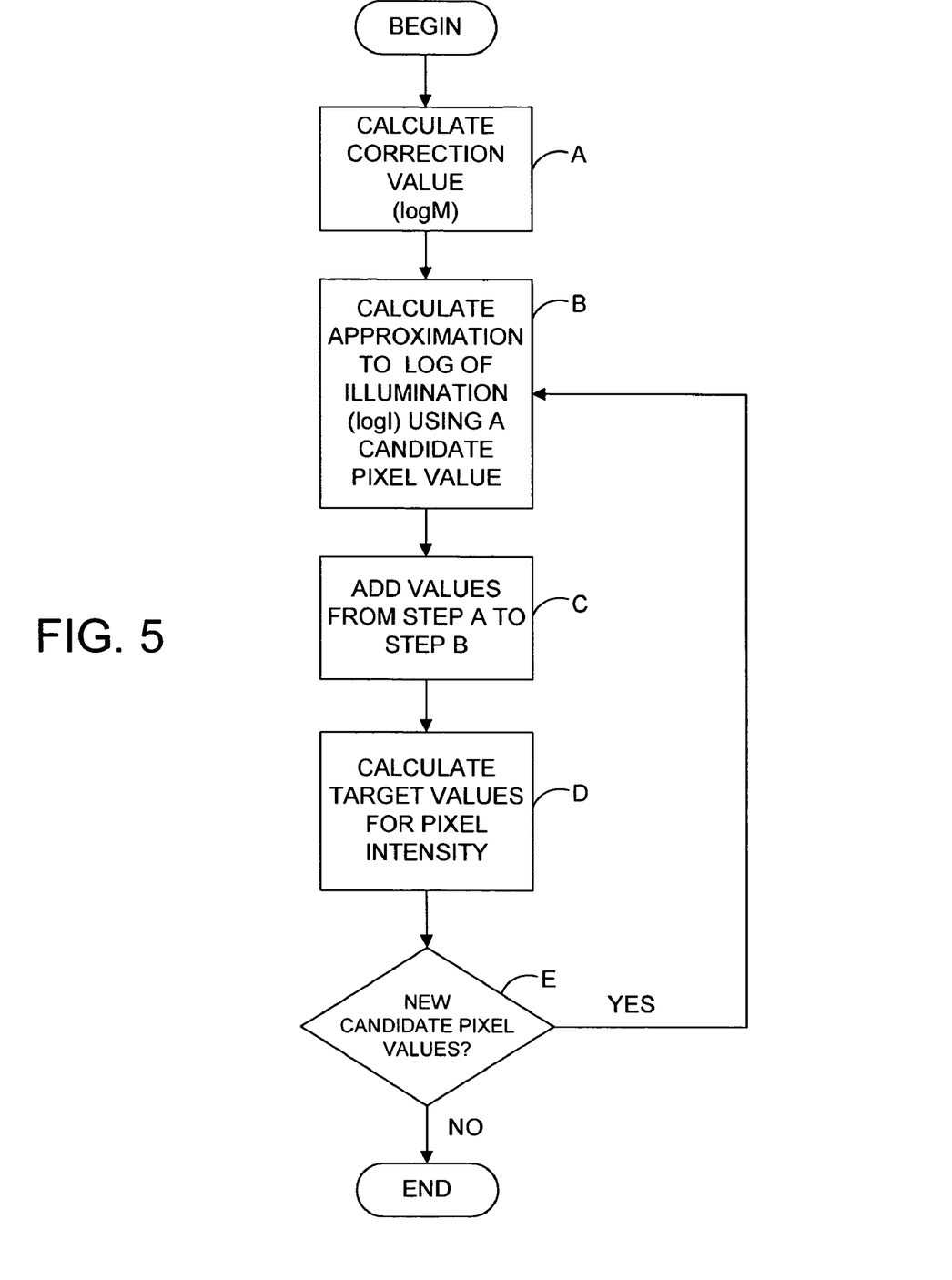
FIG. 5 is a flow chart illustrating a process for image correction in accordance with an embodiment of the invention.

FIG. 5 is a flow chart illustrating a process for correcting an image in accordance with an embodiment of the invention. In Step A, the image correction module 10 can calculate LogM, which is the log of correction amount desired (if the gain M=10LogM=1 for Log based 10 calculations). The base used in the calculations is arbitrary and any base may be used. A method for obtaining the correction value logM is to have a single sample input/output pair to calculate gain such as a white-point sample on the image or a white-point limit in a levels setting control. The LogM gain calculation can be accomplished through the use of equation (3) below:

$$\text{Log } M = \text{Log } I(D\text{out}) - \text{Log } I(D\text{in}) \quad (3)$$

In step B, the illumination log calculation components 40 calculate an approximation to the log intensity (LogI) based on an arbitrary pixel intensity input (D) using equation (2) above.

In step C, the system adds LogM to LogI. In Step D, the target pixel log intensity calculation component 60 calculates the target D' (corrected mapping for D) from equation (1) above. The generic form of equation (1) provided above can be rewritten as $D' = a(\text{LogI} + \text{LogM})^2 + b(\text{LogI} + \text{LogM}) + c$ to perform this step.

In step E, the system determines if new candidate pixel values are available and returns to step B to repeat steps B, C, and D for each available candidate pixel value.

Using the above-described technique, the calibration can calculated based on a single calibration point per curve. Subsequently, a lookup table or curve can be created for each RGB channel. Thus, an entire image can be transformed to the correct pixel values.

The process of translating to LogI space and back provides a good approximation for almost all digital cameras. Although the coefficients vary between cameras, the corrections obtained through equation (1) are completely invariant with these coefficients. A computationally simple model of the camera characteristic curve allows computations of corrections in Log-Intensity space and gets accurate mappings in the non-linear image space. An artifact of this computation is that the results are invariant with variation of the camera model parameters. Hence, the conversion is operable for a wide range of cameras.

In summary, working in raw (linear) space or log-intensity space is important for getting good color and exposure corrections, but requires accurate models of the sensor characteristics and hence is coupled strongly with manufacturers' specifications. Working in sRGB or other non-linear color spaces is convenient and widely applied, but these spaces do not lend themselves to accurate color or exposure corrections. Thus, the presently proposed process of mapping back to log-intensity space from non-linear space, applying the correction and then mapping back results solves the problem in a robust, accurate, and highly general manner that garners the best accuracy and generality characteristics of both models and sidesteps their shortcomings.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A method for coffecting white balance in an image captured by a digital image capturing device, the method comprising:
   calculating a log of a desired white point correction value based on a white point sample;
   calculating an approximation of a log of illumination based on an input pixel intensity;
   calculating a target pixel intensity value based on the log of the desired white point correction value and the approximation of the log illumination; and
   providing image correction tools for correcting the white balance of the image to correspond to the target pixel intensity value.

2. The method of claim 1, wherein calculating the log of the desired white point correction value comprising calculating Log M according to an equation: LogM=LogI(Dout)−LogI(Din), wherein LogI(Din) and LogI(Dout) are based on white point sample values.

3. The method of claim 1, wherein calculating the approximation to the log of illumination comprising calculating Log I according to an equation:

$$LogI = \frac{-b \pm \sqrt{b^2 - 4a(c-D)}}{2a},$$

wherein D is pixel intensity and a, b, and c are arbitrary constants from an image capturing device.

4. The method of claim 3, wherein calculating a target pixel intensity value comprises implementing an equation D'=a(LogI)$^2$+bLogI+c, where D' is the target pixel intensity value.

5. The method of claim 4, further comprising calculating an identical target pixel intensity value for any non-zero values of a, b, and c.

6. One or more computer-storage media having computer-readable instructions embodied thereon for performing a method for coffecting exposure and white balance of an image captured by a digital image capturing device, the method comprising:
   incorporating constants that represent characteristics of an arbitrary digital image capturing device;
   calculating an approximation to a log of illumination based on the incorporated constants and an input pixel intensity value;
   calculating a log of a desired white point correction value based on a white point sample;
   calculating a log of a desired exposure correction value based on a sample point;
   determining a target pixel intensity using the approximation to the log of illumination, the log of the desired white correction value, the log of the desired exposure correction value, and the incorporated constants, wherein constants for any image capturing device result in an identical target pixel intensity; and
   providing image correction tools in order to adjust the image to the target pixel intensity.

7. The method of claim 6, further comprising determining an identical target pixel intensity for any non-zero incorporated constants.

8. The method of claim 6, wherein calculating the log of the desired correction value comprises calculating LogM according to an equation: LogM=LogI(Dout)−LogI(Din), wherein LogI(Din) and LogI(Dout) are based on sample values.

9. The method of claim 6, wherein calculating the approximation of the log of illumination comprising calculating LogI according to an equation:

$$LogI = \frac{-b \pm \sqrt{b^2 - 4a(c-D)}}{2a},$$

wherein D is pixel intensity and a, b, and c are constants specific to the image capturing device.

10. The method of claim 6, wherein calculating a target pixel intensity value comprises implementing an equation D'=a(LogI)$^2$+bLogI+c, where D' is the target pixel intensity value.

11. An image correction system for correcting white balance in an image, the system including a computer storage medium having plurality of computer software components embodied there on, computer software components comprising:
   correction value calculation components for calculating a desired white point correction value based on a white point sample input;
   illumination log calculation components for determining an approximation to the log of illumination based on a pixel intensity and constants selected by user; and
   target pixel log intensity calculation components for determining a target pixel intensity in order to correct the white balance of the image based on the white point correction value calculation, the illumination log approximation calculation, and the selected constants.

12. The system of claim 11, wherein the white point correction value calculation components calculate the log of the desired correction value Log M according to an equation: LogM=LogI(Dout)−LogI(Din), wherein LogI(Din) and LogI(Dout) are based on white point sample values.

13. The system of claim 11, the illumination log calculation component calculates a log of illumination LogI according to an equation:

$$LogI = \frac{-b \pm \sqrt{b^2 - 4a(c-D)}}{2a},$$

wherein D is pixel intensity and a, b, and c are constants specific to the image capturing device.

14. The system of claim 13, wherein the target pixel log intensity calculation components calculate a target pixel intensity value using an equation D'=a(LogI)$^2$+bLogI+c, where D' is the target pixel intensity value.

15. The system of claim 14, wherein the target pixel log intensity calculation components calculate an identical value for target pixel intensity for any non-zero values of a, b, and c.

* * * * *